Oct. 11, 1927.

H. N. COX 1,645,374

OPTICAL ATTACHMENT

Filed Oct. 10, 1925

WITNESSES:
A. H. Pendleton
E. R. Evans

INVENTOR
Harold N. Cox
BY
J. H. Procter
ATTORNEY

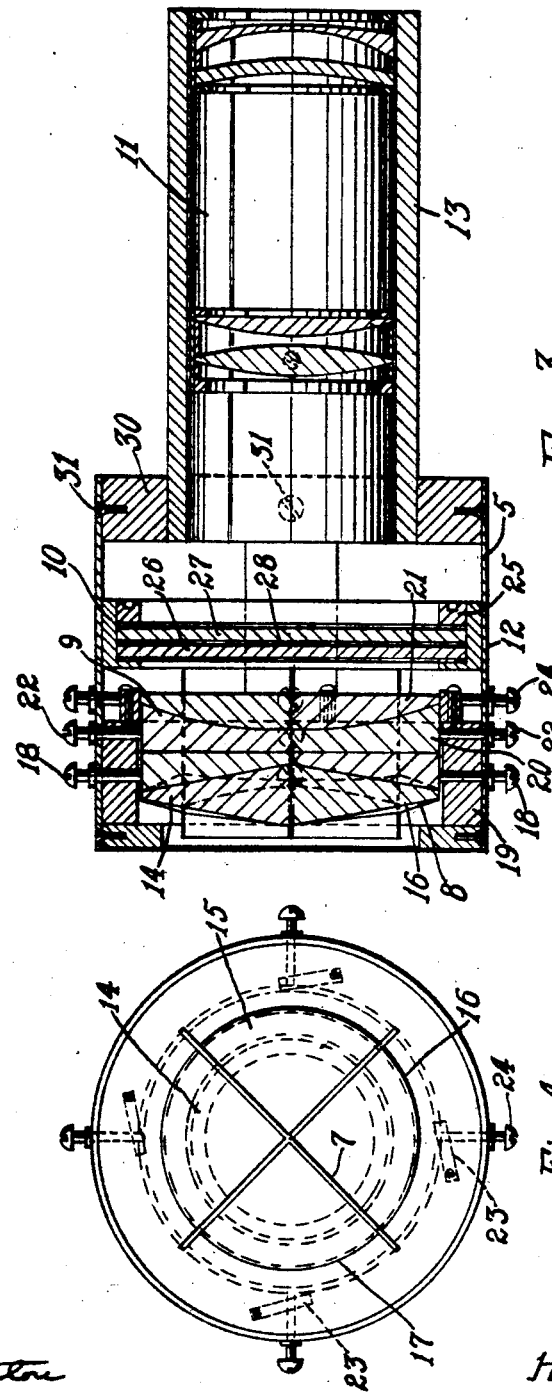

Patented Oct. 11, 1927.

1,645,374

UNITED STATES PATENT OFFICE.

HAROLD N. COX, OF GLEN RIDGE, NEW JERSEY, ASSIGNOR TO COX MULTI-COLOR PHOTO COMPANY, A CORPORATION OF DELAWARE.

OPTICAL ATTACHMENT.

Application filed October 10, 1925. Serial No. 61,698.

My invention relates to optical attachments and particularly to optical attachments for color photography.

An object of my invention is to provide an attachment for either a camera or a projecting machine to produce multiple colored images.

Another object of my invention is to provide a unitary housing for the lens, prisms and color screens to insure correct relative positions thereof.

Another object of my invention is to provide a unitary attachment that shall have means therein for adjusting the prisms.

Another object of my invention is to provide a unitary attachment, of the above indicated character, that shall have means for positioning and precluding the overlapping of the images produced by prisms of quadrant shape.

Another object of my invention is to provied a unitary attachment, of the above indicated character, that shall have means for adjusting the deviation of the prisms.

Another object of my invention is to provide a unitary attachment that shall have a plurality of prisms so placed at the front principal focus of the lens of the device as to produce a plurality of monochrome images.

A further object of my invention is to provide an attachment, of the above indicated character, that shall be simple and relatively inexpensive to construct and effective in its operation.

In practising my invention I provide a housing of cylindrical form and place an image forming lens at one end thereof. At the front principal focus of the image forming lens at the other end of the housing, I dispose four quadrant shaped achromatic prisms. The prisms are separated by barriers as are also the parts of an optical adjusting device for the prisms. A color filter is also disposed in the housing and a hood surrounds the outer portion of the barriers round the end of the housing in which the prisms are disposed.

Such a unitary assembly is applicable for use in a camera to produce four monochrome images or for projecting such four monochrome images onto a screen to produce a single image in natural colors.

In my copending application Serial No. 472,145, filed May 24, 1921, I have disclosed, in general, a system of color photography with which my present invention may be used to advantage.

In the accompanying drawing, Fig. 1 is a side elevational view of a unitary optical attachment embodying my invention;

Fig. 3 is a side sectional view of the main housing of the attachment shown in Figs. 1 and 2, and Fig. 4 is an enlarged front view of the housing with the hood removed.

Figure 1:
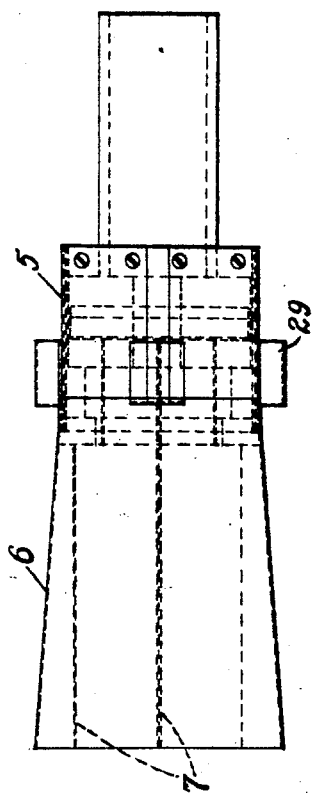
Figure 2:
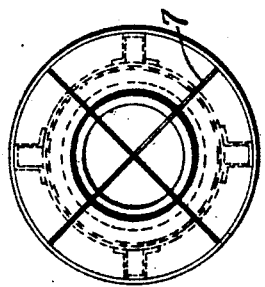
Fig. 2 is a front elevational view of the attachment shown in Fig. 1.

My invention comprises, in general, a housing or casing 5, a hood 6 for one end thereof, separators 7, a prismatic assembly 8, an optical adjusting device 9 therefor, a color filter assembly 10 and an image forming lens assembly 11, all disposed in the casing.

The housing 5 is cylindrical in shape having two portions 12 and 13 in the latter of which is disposed the lens assembly 11 and in the former of which is disposed the prismatic assembly 8.

The prismatic assembly 8 comprises four achromatic prisms of quadrant shape 14, 15, 16 and 17, so arranged as to produce four monochrome images of a single object substantially as set forth in my above mentioned copending application. The prismatic assembly 8 is secured in the portion 12 of the housing 5 by screws 18 which are seated also in an annular member 19 adjacent the end of the housing.

The optical adjusting device 9 comprises four plano-concave quadrant shaped lenses 20 and a similar number of plano-convex quadrant shaped lenses 21. The lenses 20 are disposed adjacent the prisms 14, 15, 16 and 17 and the separators 7 are disposed between the various corresponding quadrants. Screws 22 are provided for clamping the adjusting device 9 in position after the plano-concave members 21 have been shifted relatively to the plano-convex members 20 to cause the images of the prisms 14 to 17, inclusive, to be correctly positioned. Pivotally mounted clamping members 23 that are actuated by screws 24 are provided for shifting the lenses and retaining them in position after adjustment.

It has been found that this adjusting device which is disclosed more fully in my copending application Serial No. 61,697, filed on even date herewith, precludes the necessity of accurately grinding and polishing the prisms and, consequently, enables a commercial device for color photography to be built.

The color screen 10 comprises a holder 25, two plates of glass 26 and 27 between which four quadrant shaped color filters 28 of the primary colors are disposed. It is, of course, conceivable that the color filter may be effectively cooled by any desirable means. The image forming lens assembly 11 is one form of the ordinary lenses used in cameras or projecting machines.

A protecting housing 29 is disposed around the screws 18, 22 and 24 to protect the same. The portion 12 of the housing 5 is secured to the portion 13 through an annular member 30 and screws 31. The partitions 7 are held in position by the hood 6 and also by reason of the fact that the inner end of the partitions are secured between the quadrants of the prisms. The partitions preclude overlapping the images.

My unitary attachment is adaptable for use with a camera to obtain four monochrome images which are effectively screened by the color screens in such manner that when my device is used in a projecting machine, the four images thus formed may be projected as one composite image in natural colors. My device is applicable to motion picture projecting machines and has been found to produce excellent clear pictures in natural colors.

My invention is, of course, not limited to the specific details shown as it may be variously modified without departing from the spirit and scope of the invention as set forth in the appended claims.

I claim as my invention:

1. A unitary attachment for an optical device comprising a holder, an image forming lens at one end thereof, four quadrant shaped achromatic prisms at the other end thereof, means for securing the prisms in position, adjusting lenses of quadrant shape in the holder between the image forming lens and the prisms and means for so adjusting the positions of the adjusting lenses that four monochrome images are formed by the prisms.

2. A unitary attachment for an optical device comprising a holder, an image forming lens at one end thereof, four quadrant shaped achromatic prisms at the other end thereof, means for securing the prisms in position, adjusting lenses of quadrant shape in the holder between the image forming lens and the prisms, means for so adjusting the position of the adjusting lenses that four monochrome images are formed by the prisms and continuous partitions between the prisms and the corresponding adjusting lenses.

3. A unitary attachment for an optical device comprising a holder, an image forming lens at one end thereof, four quadrant shaped achromatic prisms at the other end thereof, means for securing the prisms in position, adjusting lenses of quadrant shape in the holder between the image forming lens and the prisms, means for so adjusting the position of the adjusting lenses that four monochrome images are formed by the prisms, continuous partitions between the prisms and the corresponding adjusting lenses, and a hood for one end of the holder.

4. A unitary attachment for an optical device comprising a holder, an image-forming lens at one end thereof, four prisms of quadrant shape disposed at the front principal focus of the lens in the holder, quadrant-shaped lenses in the holder between the image-forming lens and the prisms, the said quadrant-shaped lenses being adjustable, whereby four correctly positioned images may be formed, and partitions for precluding the overlapping of the images formed by the prisms.

5. A unitary attachment for an optical device comprising a holder, an image-forming lens at one end thereof, four prisms of quadrant shape disposed at the front principal focus of the lens in the holder, quadrant-shaped lenses in the holder between the image-forming lens and the prisms, the said quadrant-shaped lenses being adjustable, whereby four correctly positioned images may be formed, partitions for precluding the overlapping of the images formed by the prisms, and color filters between the prisms and the image-forming lens.

In testimony whereof, I have hereunto subscribed my name this third day of October, 1925.

HAROLD N. COX.